US012662069B2

(12) United States Patent
Liu

(10) Patent No.: US 12,662,069 B2
(45) Date of Patent: Jun. 23, 2026

(54) COMBUSTION AND EXPLOSION-PROOFING SAFETY MANAGEMENT SYSTEM FOR VEHICLE-MOUNTED FLAMMABLE AND EXPLOSIVE ARTICLES

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 0 days.

(21) Appl. No.: 18/723,710

(22) PCT Filed: Nov. 4, 2022

(86) PCT No.: PCT/CN2022/129864
§ 371 (c)(1),
(2) Date: Jun. 24, 2024

(87) PCT Pub. No.: WO2023/236429
PCT Pub. Date: Dec. 14, 2023

(65) Prior Publication Data
US 2025/0065831 A1      Feb. 27, 2025

(30) Foreign Application Priority Data
Jun. 7, 2022      (CN) .......................... 202210642189.9

(51) Int. Cl.
*B60R 16/023* (2006.01)
*G08B 21/16* (2006.01)

(52) U.S. Cl.
CPC .......... *B60R 16/0232* (2013.01); *G08B 21/16* (2013.01); *B60R 2225/00* (2013.01)

(58) Field of Classification Search
CPC . B60R 16/0232; B60R 2225/00; Y02P 90/02; B66C 15/06; E02F 9/267; B60W 30/18009; B60K 35/28
See application file for complete search history.

(56) References Cited

U.S. PATENT DOCUMENTS

| | | | |
|---|---|---|---|
| 8,098,144 B2 * | 1/2012 | Honkonen | .......... B60R 25/1004 340/426.33 |
| 2014/0266739 A1 * | 9/2014 | Chen | ....................... G16H 40/67 340/576 |

(Continued)

FOREIGN PATENT DOCUMENTS

| | | |
|---|---|---|
| CN | 101067744 | 11/2007 |
| CN | 101943895 | 1/2011 |

(Continued)

OTHER PUBLICATIONS

Liu, Caixia; International Search Report and Written Opinion for PCT/CN2022/129864, filed Nov. 4, 2022, mailed Dec. 28, 2022, 14 pages.

*Primary Examiner* — Mirza F Alam
(74) *Attorney, Agent, or Firm* — Fennemore Craig, P.C.

(57) ABSTRACT

The present invention discloses an on-board combustibles and explosives anti-combustion and anti-explosion safety management system. The system includes an on-board combustibles and explosives physical and chemical safety monitoring and warning unit, an on-board gateway unit, an alarm prompt unit, and a remote management unit. The system automatically monitors physical and chemical safety information of the on-board combustibles and explosives. When a monitoring result shows that there may be a risk of combustion, explosion, or leakage of the combustibles and explosives, warning information is sent, and when a warning is triggered, a local warning acousto-optic or voice prompt is sent to prompt a driver to stop for inspection through the (Continued)

alarm prompt unit while the warning information is sent to the remote management unit through a network communication module of the on-board gateway unit.

9 Claims, 4 Drawing Sheets

(56)                 References Cited

U.S. PATENT DOCUMENTS

| 2021/0079628 A1* | 3/2021 | Wiethorn | ................ | B66C 23/88 |
| 2022/0295216 A1* | 9/2022 | Toopran | ................ | B60K 35/26 |

FOREIGN PATENT DOCUMENTS

| CN | 103455409 | 12/2013 |
| CN | 105574699 | 5/2016 |
| CN | 110044409 | 7/2019 |
| CN | 115223340 | 10/2022 |

* cited by examiner

COMBUSTION AND EXPLOSION-PROOFING SAFETY MANAGEMENT SYSTEM FOR VEHICLE-MOUNTED FLAMMABLE AND EXPLOSIVE ARTICLES

CROSS-REFERENCE TO RELATED APPLICATIONS

The present application is a National Stage application of PCT international application: PCT/CN2022/129864, filed on 4 Nov. 2022, the disclosure of which is hereby incorporated by reference in its entirety.

TECHNICAL FIELD

The present invention relates to a vehicle safety technology, and in particular, to combustion and explosion risk control technologies for combustibles and explosives transported by hazardous goods transportation vehicles.

BACKGROUND

A transport vehicle carrying combustibles and explosives is a major source of mobile hazard. Compared with an ordinary vehicle, an accident is more likely to occur, and a transportation safety accident of the flammable and explosive materials is different from a general transportation accident, which is often sudden, complex, and more harmful, and even leads to a serious consequence such as combustion, explosion, and leakage, causing a series of social problems such as economic losses, environmental pollution, ecological damage, and casualties.

The existing safety monitoring for the transport vehicle carrying the combustibles and explosives mainly focuses on the monitoring of an operating status of the vehicle, such as vehicle speed and positioning, and cannot realize effective monitoring and risk warning of a plurality of states of on-board combustibles and explosives during a transportation process. However, due to the flammable and explosive properties of the combustibles and explosives, during vehicle transportation, a risk of explosion may occur in response to a change in temperature, humidity; pressure, and violent vibration caused by a road condition. It may also accidentally encounter an explosion caused by a fire source due to a possible leakage of the combustibles and explosives, which causes concentration or volume fraction in the air to reach an explosion limit and leads to a serious accident related to transportation of hazardous chemicals.

Therefore, how to perform effective safety monitoring of the on-board combustibles and explosives during the transportation process, thereby preventing occurrence of combustion, explosion, leakage, or pollution of the on-board combustibles and explosives, and ensuring the safety of carrying the combustibles and explosives is an urgent problem to be solved in this field.

SUMMARY

For problems existing in supervising safety status during transportation of an existing combustibles and explosives, an on-board combustibles and explosives safety monitoring solution that can effectively prevent and control an explosion risk of the combustibles and explosives during transportation is required.

The present invention is intended to provide an on-board combustibles and explosives safety management system that can comprehensively monitor a physical and chemical safety parameter of the on-board combustibles and explosives during transportation. The system can comprehensively monitor the physical and chemical safety parameter of the on-board combustibles and explosives during transportation, thereby effectively improving the transportation safety of the on-board combustibles and explosives.

In order to achieve the above object, the present invention provides an on-board combustibles and explosives anti-combustion and anti-explosion safety management system, including:

an on-board combustibles and explosives physical and chemical safety monitoring and warning unit, where the on-board combustibles and explosives physical and chemical safety monitoring and warning unit is associated with an on-board gateway unit, and is associated with an alarm prompt unit and a remote management unit through the on-board gateway unit and the on-board combustibles and explosives physical and chemical safety monitoring and warning unit is configured to: monitor a physical and chemical safety parameter of the on-board combustibles and explosives in real time, perform warning analysis on physical and chemical safety of the on-board combustibles and explosives directly or in cooperation with the on-board gateway unit based on the monitored information, generate warning information when a physical and chemical safety risk occurs in the on-board combustibles and explosives, send warning information to the remote management unit through the on-board gateway unit, and send a warning through the alarm prompt unit;

the on-board gateway unit, where the on-board gateway unit is respectively associated with the on-board combustibles and explosives physical and chemical safety monitoring and warning unit, the alarm prompt unit, and the remote management unit, a communication channel is established between the units to complete data exchange, and the on-board gateway unit is configured to complete risk warning processing based on the data information collected by the unit in cooperation with the on-board combustibles and explosives physical and chemical safety monitoring and warning unit;

the alarm prompt unit, where the alarm prompt unit is connected to the on-board gateway unit, and is configured to complete a local alarm on a vehicle and/or complete a remote alarm through the remote management unit associated with the on-board gateway unit; and the remote management unit, where the remote management unit is associated with the on-board gateway unit, is indirectly associated with the on-board combustibles and explosives physical and chemical safety monitoring and warning unit and the alarm prompt unit through the on-board gateway unit, and the remote management unit is configured to form system configuration information and/or emergency handling information, and receive on-board combustibles and explosives physical and chemical safety monitoring and warning information sent by the on-board gateway unit.

Further, the on-board combustibles and explosives physical and chemical safety monitoring and warning unit includes one or more of a temperature monitoring module, a humidity monitoring module, a pressure monitoring module, a vibration monitoring module, and a leakage detection module.

The temperature monitoring module is configured to obtain real-time information of a temperature of the on-board combustibles and explosives, a temperature in a compartment, or a temperature of a tank, and transmit the obtained information to the on-board gateway unit or to the remote management unit through the on-board gateway unit.

The humidity monitoring module is configured to obtain real-time information of a humidity of the on-board combustibles and explosives and a humidity in the compartment, and transmit the obtained information to the on-board gateway unit or to the remote management unit through the on-board gateway unit.

The pressure monitoring module is configured to obtain real-time information of a pressure of the on-board combustibles and explosives, a pressure in the compartment, or a pressure in the tank, and transmit the obtained information to the on-board gateway unit or to the remote management unit through the on-board gateway unit.

The vibration monitoring module is configured to obtain real-time information of vibration in a vehicle compartment or at a tank position loaded with the on-board combustibles and explosives, and transmit the obtained information to the on-board gateway unit or to the remote management unit through the on-board gateway unit.

The leakage detection module is configured to obtain real-time information of a leakage condition of the on-board combustibles and explosives and a leakage condition of gas in the vehicle compartment loaded with the on-board combustibles and explosives or a leakage condition of liquid or gas at an outlet of the tank, and transmit the obtained information to the on-board gateway unit or to the remote management unit through the on-board gateway unit.

Further, each monitoring device of a temperature monitoring module, a humidity monitoring module, a pressure monitoring module, a vibration monitoring module, and a leakage detection module in the on-board combustibles and explosives physical and chemical safety monitoring and warning unit is configured to aggregate the monitoring information to a data storage module of the on-board gateway unit, perform warning analysis through the on-board gateway unit, and send a corresponding warning prompt to the alarm prompt unit through the on-board gateway unit and upload alarm prompt information to the remote management unit through the on-board gateway unit when a temperature, a humidity, a pressure, a vibration intensity, or a leakage detection result is higher than a set threshold, and a risk of combustion, explosion, or leakage of the combustibles and explosives occurs.

Further, the on-board gateway unit includes a network communication module and/or a data storage module, and/or an edge computing module.

The network communication module is configured for data interaction between the on-board combustibles and explosives physical and chemical safety monitoring and warning unit, the alarm prompt unit, and the remote management unit.

The data storage module is configured to store monitoring information uploaded by the on-board combustibles and explosives physical and chemical safety monitoring and warning unit.

The edge computing module is configured to intelligently analyze and determine the monitoring information uploaded by the on-board combustibles and explosives physical and chemical safety monitoring and warning unit.

Further, the on-board gateway unit is directly related to the on-board combustibles and explosives physical and chemical safety monitoring and warning unit, the alarm prompt unit, and the remote management unit.

When the on-board gateway unit receives the monitoring information of the on-board combustibles and explosives physical and chemical safety monitoring and warning unit and analyzes and determines that a warning and alarm related to combustion and explosion of the combustibles and explosives is triggered, the on-board gateway unit sends an acousto-optic alarm or voice prompt information to the alarm prompt unit and sends warning and alarm information and real-time monitoring information to the remote management unit.

When receiving an alarm command, a voice prompt command, or an alarm threshold setting adjustment, or emergency rescue guide information sent by the remote management unit, the on-board gateway unit sends the alarm command and the voice prompt command information to the alarm prompt unit, and sends the alarm threshold setting adjustment and circuit control command information to a relevant monitoring device of the on-board combustibles and explosives physical and chemical safety monitoring and warning unit to perform a relevant operation of adjusting an alarm threshold of a monitoring sensor.

Further, the alarm prompt unit includes a vehicle local alarm prompt subunit and a remote monitoring client software alarm prompt subunit.

Further, the remote management unit includes a government industry management client software, an enterprise operation management client software, a driver and passenger service client software, and a communication center.

The government industry management client software is configured to receive and display high-risk-level on-board combustibles and explosives physical and chemical safety monitoring and warning information forwarded by the on-board combustibles and explosives physical and chemical safety monitoring and warning unit through the on-board gateway unit and the communication center, send a relevant management command based on received warning and alarm information, start an emergency management process, and issue a relevant emergency response command.

The enterprise operation management client software is configured to receive and display on-board combustibles and explosives physical and chemical safety monitoring and warning information forwarded by the on-board combustibles and explosives physical and chemical safety monitoring and warning unit through the on-board gateway unit and the communication center, send the relevant management command or the emergency rescue guide information based on the received warning and alarm information, and start the emergency management process, push emergency rescue guide file information of the on-board combustibles and explosives to an emergency rescue guide module of the on-board combustibles and explosives, send an emergency alarm to the government industry management client, and issue a relevant emergency response command when receiving the high-risk-level on-board combustibles and explosives physical and chemical safety monitoring and warning information.

The driver and passenger service client software is configured to receive and display on-board combustibles and explosives physical and chemical safety monitoring and warning information forwarded by the on-board combustibles and explosives physical and chemical safety monitoring and warning unit through the on-board gateway unit and the communication center, send an acousto-optic alarm, a voice prompt, and an emergency rescue guide corresponding to alarm and warning information based on the received alarm and warning information, to prompt the driver to stop nearby or stop immediately for inspection, and provide a corresponding emergency response guide.

The communication center is configured to communicate with the on-board gateway unit, receive and store the on-board combustibles and explosives physical and chemical safety monitoring and warning information forwarded by the on-board combustibles and explosives physical and chemical safety monitoring and warning unit through the on-board gateway unit, and forward the physical and chemical safety monitoring and warning information to the government industry management client software, the enterprise operation management client software, and the driver and passenger service client software respectively.

Further, the remote management unit is arranged on a cloud platform and/or a local storage server of a competent government industry department related to vehicle traffic management or operation management and/or a personal hand-held intelligent terminal of a relevant management person, a cloud platform and/or a local storage server of a transport enterprise and transport-related parties to which the vehicle belongs and/or a personal hand-held intelligent terminal of a relevant management person, and a personal hand-held intelligent terminal of a driver and passenger, is associated with the on-board gateway unit, and is indirectly associated with the on-board combustibles and explosives physical and chemical safety monitoring and warning unit and the alarm prompt unit through the on-board gateway unit.

The on-board combustibles and explosives anti-combustion and anti-explosion safety management system can realize comprehensive real-time monitoring of a temperature of the on-board combustibles and explosives and a temperature in a compartment, a humidity of the on-board combustibles and explosives and a humidity in the compartment, a pressure of the on-board combustibles and explosives and a pressure in the compartment or a tank, a vibration in the compartment or a tank position of the on-board combustibles and explosives, a leakage of the on-board combustibles and explosives, a leakage of gas in the compartment of the vehicle loaded with the on-board combustibles and explosives, or a leakage of liquid or gas at an outlet of the tank, and comprehensively determine whether there is a risk of combustion, explosion, and leakage of the combustibles and explosives based on above. When a temperature, humidity, pressure, vibration intensity, or leakage detection result is higher than a set threshold, a risk of burning, explosion, or leakage of the combustibles and explosives occurs, the local warning acousto-optic or voice prompt is sent to prompt a driver to stop for inspection through the alarm prompt unit while the warning information is sent to the remote management unit through the network communication module of the on-board gateway unit.

BRIEF DESCRIPTION OF THE DRAWINGS

The present invention is further explained below with reference to the accompanying drawings and specific implementations.

DETAILED DESCRIPTION

In order to make the technical means, creation features, purpose and efficacy realized by the present invention easy to understand, the present invention is further described below in conjunction with the specific illustrations.

In view of a safety risk of combustibles and explosives in a process of transportation, it is necessary to perform comprehensive and effective safety monitoring of on-board combustibles and explosives in the process of transportation. This example provides an on-board combustibles and explosives anti-combustion and anti-explosion safety management system that can comprehensively monitor a physical and chemical safety parameter of on-board combustibles and explosives.

The on-board combustibles and explosives anti-combustion and anti-explosion safety management system can realize synchronous real-time monitoring of a temperature of the on-board combustibles and explosives and a temperature in a compartment, a humidity of the on-board combustibles and explosives and a humidity in the compartment, a pressure of the on-board combustibles and explosives and a pressure in the compartment or a tank, a vibration in the compartment or a tank position of the on-board combustibles and explosives, a leakage of the on-board combustibles and explosives, a leakage of gas in the compartment of the vehicle loaded with the on-board combustibles and explosives, or a leakage of liquid or gas at an outlet of the tank, and comprehensively determine whether there is a risk of combustion, explosion, and leakage of the combustibles and explosives based on above. A warning message is sent when a temperature, humidity, pressure, vibration intensity, or leakage detection result is higher than a set threshold, a risk of burning, explosion, or leakage of the combustibles and explosives occurs.

Figure 1:
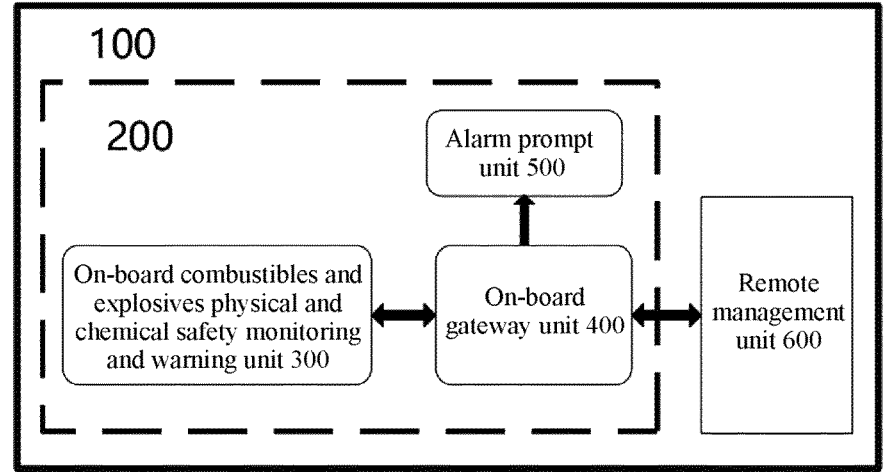
FIG. 1 is a schematic diagram of an overall composition principle of an on-board combustibles and explosives anti-combustion and anti-explosion safety management system according to an example of the present invention.

FIG. 1 is a schematic diagram of an overall composition principle of an on-board combustibles and explosives anti-combustion and anti-explosion safety management system according to an example.

Based on FIG. 1, the on-board combustibles and explosives anti-combustion and anti-explosion safety management system 100 provided in this example is mainly composed of an on-board combustibles and explosives physical and chemical safety monitoring and warning unit 300, an on-board gateway unit 400, an alarm prompt unit 500, and a remote management unit 600, which are in cooperation with each other.

Based on FIG. 1, a sensor of the on-board combustibles and explosives physical and chemical safety monitoring and warning unit 300 in this system is arranged on an outer package or an inner package of the on-board combustibles and explosives of a hazardous goods transportation vehicle 200 to be monitored, or in a different position in a truck compartment where the combustibles and explosives are loaded, is associated with the on-board gateway unit 400 of the vehicle, and is associated with the alarm prompt unit 500 and the remote management unit 600 through the on-board gateway unit 400.

The on-board combustibles and explosives physical and chemical safety monitoring and warning unit 300 can realize real-time monitoring of a temperature of the on-board combustibles and explosives and a temperature in a compartment, a humidity of the on-board combustibles and explosives and a humidity in the compartment, a pressure of the on-board combustibles and explosives and a pressure in the compartment or a tank, a vibration in the compartment or a tank position of the on-board combustibles and explosives, a leakage of the on-board combustibles and explosives, a leakage of gas in the compartment of the vehicle loaded with the on-board combustibles and explosives, or a leakage of liquid or gas at an outlet of the tank.

Moreover, the on-board combustibles and explosives physical and chemical safety monitoring and warning unit 300 can also store the collected monitoring information in a data storage module of the on-board gateway unit 400, analyze a collected monitoring result through the sensor or through an edge computing module of the on-board gateway unit 400, and comprehensively determine whether there is a risk of combustion, explosion, and leakage of the combustibles and explosives. When a temperature, humidity, pressure, vibration intensity, or leakage detection result is higher than a set threshold, a risk of burning, explosion, or leakage of the combustibles and explosives occurs, the local warning acousto-optic or voice prompt is sent to prompt a driver to stop for inspection through the alarm prompt unit while the warning information is sent to the remote management unit 600 through the network communication module of the on-board gateway unit 400.

Figure 2:
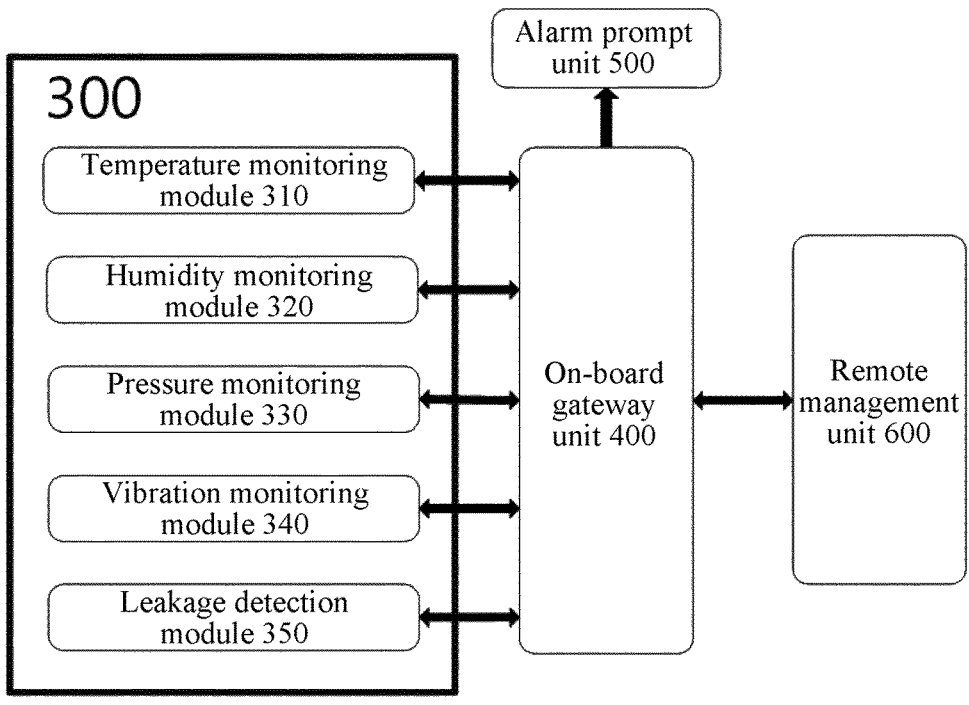
FIG. 2 is a schematic diagram of a composition principle and a use flow chart of an on-board combustibles and explosives physical and chemical safety monitoring and warning unit according to an example of the present invention.

FIG. 2 is a schematic diagram of a specific composition principle and a use flow chart of an on-board combustibles and explosives physical and chemical safety monitoring and warning unit 300 according to an example of the present invention.

Based on FIG. 2, the on-board combustibles and explosives physical and chemical safety monitoring and warning unit 300 provided in this example is mainly composed of a temperature monitoring module 310, a humidity monitoring module 320, a pressure monitoring module 330, a vibration monitoring module 340, and a leakage detection module 350, which are in cooperation with each other.

Figure 3:
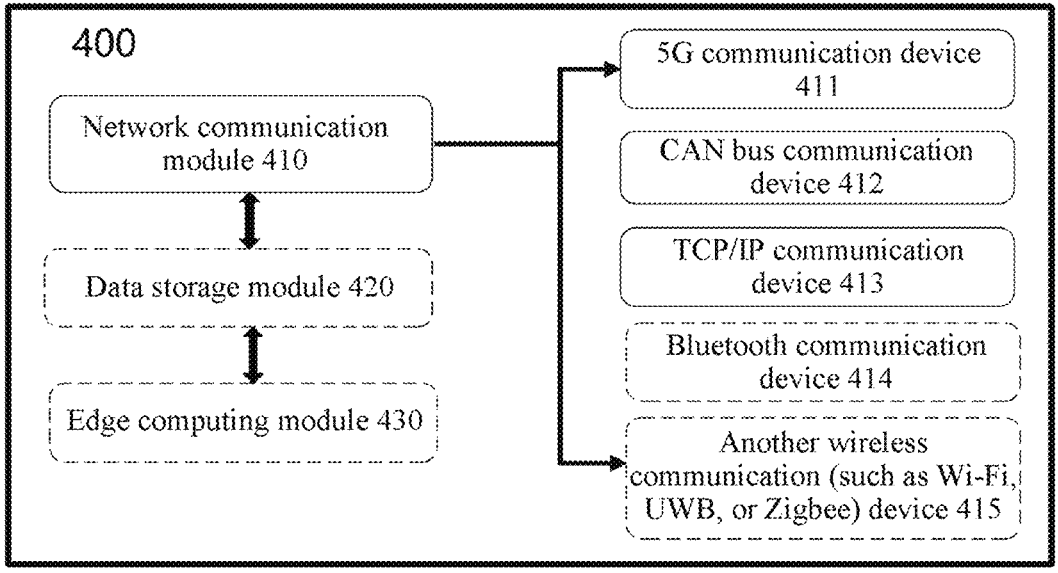
FIG. 3 is a schematic diagram of a composition principle of an on-board gateway unit and a network communication module thereof according to an example of the present invention.

For ease of expression, a basic construction solution of the on-board gateway unit 400 in the following example solution is described here. FIG. 3 is a schematic diagram of a composition principle of an on-board gateway unit and a network communication module thereof according to an example of the present invention. Based on FIG. 3, the on-board gateway unit 400 of the on-board combustibles and explosives anti-combustion and anti-explosion safety management system 700 provided in this example is mainly composed of a network communication module 410, a data storage module 420, and an edge computing module 430, which are in cooperation with each other.

Further, the temperature monitoring module 310 in the on-board combustibles and explosives physical and chemical safety monitoring and warning unit 300 is configured to obtain real-time information on temperature of the on-board combustibles and explosives, temperature in a compartment or temperature of a tank, and transmit the obtained information to the data storage module of the on-board gateway unit, the edge computing module, or to the remote management unit through the network communication module of the on-board gateway unit.

The humidity monitoring module 320 in the on-board combustibles and explosives physical and chemical safety monitoring and warning unit 300 is configured to obtain real-time information on humidity of the on-board combustibles and explosives and the humidity in the compartment, and transmit the acquired information to the data storage module of the on-board gateway unit, the edge computing module, or to the remote management unit through the network communication module of the on-board gateway unit.

The pressure monitoring module 330 in the on-board combustibles and explosives physical and chemical safety monitoring and warning unit 300 is configured to obtain real-time information on pressure of the on-board combustibles and explosives, pressure in the compartment or pressure of the tank, and transmit the acquired information to the data storage module of the on-board gateway unit, the edge computing module, or to the remote management unit through the network communication module of the on-board gateway unit.

The vibration monitoring module 340 in the on-board combustibles and explosives physical and chemical safety monitoring and warning unit 300 is configured to obtain real-time information on vibration in a vehicle compartment or a tank position loading the on-board combustibles and explosives, and transmit the obtained information to the data storage module of the on-board gateway unit, the edge computing module, or to the remote management unit through the network communication module of the on-board gateway unit.

The leakage detection module 350 in the on-board combustibles and explosives physical and chemical safety monitoring and warning unit 300 is configured to obtain real-time information on leakage of the on-board combustibles and explosives and leakage of gas in the compartment of the vehicle loaded with the on-board combustibles and explosives or leakage of liquid or gas at an outlet of the tank, and transmit the acquired information to the data storage module of the on-board gateway unit, the edge computing module, or to the remote management unit through the network communication module of the on-board gateway unit.

Based on FIG. 1, FIG. 2, and FIG. 3, the on-board combustibles and explosives physical and chemical safety monitoring and warning unit 300 arranged in this way is convenient to use the temperature monitoring module 310 to monitor the temperature of the on-board combustibles and explosives and the temperature in the compartment in real time, use the humidity monitoring module 320 to monitor the humidity of the on-board combustibles and explosives and the humidity in the compartment in real time, use the pressure monitoring module 330 to monitor the pressure of the on-board combustibles and explosives and the pressure in the compartment or in the tank in real time, use the vibration monitoring module 340 to monitor the vibration in the compartment or the tank position of the vehicle loaded with the on-board combustibles and explosives in real time, and use the leakage detection module 350) to monitor the leakage of the on-board combustibles and explosives, the leakage of gas in the compartment of the vehicle loaded with the on-board combustibles and explosives, or the leakage of liquid or gas at the outlet of the tank.

The on-board combustibles and explosives physical and chemical safety monitoring and warning unit 300 uploads the monitoring information to the data storage module 420 of the on-board gateway unit 400 through the network communication module 410 of the on-board gateway unit 400, and performs intelligent analysis through the edge computing module 430 of the on-board gateway unit 400. When the temperature, humidity, pressure, vibration intensity, or leakage detection result is higher than a set threshold, a risk of burning, explosion, or leakage of the combustibles and explosives occurs, the local warning acousto-optic or voice prompt is sent through the alarm prompt unit 500 while the warning information is sent to the remote management unit 600 through the network communication module 410 of the on-board gateway unit 400.

Based on FIG. 1, the on-board gateway unit 400 in this system is arranged in a cab of the hazardous goods transportation vehicle 200 to be monitored, and is respectively associated with the on-board combustibles and explosives physical and chemical safety monitoring and warning unit 300, the alarm prompt unit 500, and the remote management unit 600.

The on-board gateway unit 400 has at least a network communication function, a data storage function, and an edge computing function. The on-board gateway unit 400 can establish a communication channel with the remote management unit 600 to analyze sensing monitoring data information generated by the on-board combustibles and explosives physical and chemical safety monitoring and warning unit. When the analysis result triggers an alarm, alarm information is sent to the remote management unit and the alarm prompt unit respectively, and a management command such as threshold setting adjustment of the remote management unit is sent to the on-board combustibles and explosives physical and chemical safety monitoring and warning unit.

FIG. 3 is a schematic diagram of a composition principle and a network communication module of an on-board gateway unit 400 of the on-board combustibles and explosives anti-combustion and anti-explosion safety management system according to this example.

Based on FIG. 3, the on-board gateway unit 400 provided in this example is composed of a network communication module 410, a data storage module 420, and an edge computing module 430 combined with each other.

The network communication module 410 is used for data interaction between the on-board combustibles and explosives physical and chemical safety monitoring and warning unit, the alarm prompt unit, and the remote management unit, and is configured to forward the monitoring information and the analysis result uploaded by the on-board combustibles and explosives physical and chemical safety monitoring and warning unit to the remote management unit, or forward alarm command and voice prompt command information to the alarm prompt unit based on the received remote management unit instruction, and forward the command information such as alarm threshold setting adjustment and circuit control to the relevant monitoring device of the on-board combustibles and explosives physical and chemical safety monitoring and warning unit.

The data storage module 420 is configured to store monitoring information uploaded by the on-board combustibles and explosives physical and chemical safety monitoring and warning unit.

The edge computing module 430 is configured to intelligently analyze and determine the monitoring information uploaded by the on-board combustibles and explosives physical and chemical safety monitoring and warning unit.

Based on FIG. 1 and FIG. 3, the on-board gateway unit 400 arranged in this way performs communication connection and data interaction of a plurality of devices installed in the on-board combustibles and explosives physical and chemical safety monitoring and warning unit 300 through the network communication module 410, and realizes information exchange with the alarm prompt unit 500 and the remote management unit 600. The data storage module 420 is configured to aggregate and store monitoring data of the plurality of sensors, and the edge computing module 430 is configured to intelligently analyze the plurality of monitoring data.

When the on-board gateway unit 400 receives the monitoring information of the on-board combustibles and explosives physical and chemical safety monitoring and warning unit 300 and analyzes and determines that a relevant warning alarm of the combustibles and explosives is triggered, the on-board gateway unit 400 sends an acousto-optic alarm or voice prompt information to the alarm prompt unit 500 and the real-time monitoring information to the remote management unit 600. When the on-board gateway unit 400 receives an alarm command, a voice prompt command, or an alarm threshold setting adjustment, or emergency rescue guide information sent by the remote management unit 600, the alarm command and the voice prompt command information are sent to the alarm prompt unit 500, and alarm threshold setting adjustment and circuit control command information are sent to the relevant monitoring device of the on-board combustibles and explosives physical and chemical safety monitoring and warning unit 300 to adjust an alarm threshold of a monitoring sensor.

Based on FIG. 1, the alarm prompt unit 500 in the system has a vehicle local alarm prompt subunit and a remote monitoring client software alarm prompt subunit. The vehicle local alarm prompt subunit (such as a local acousto-optic alarm or a voice prompt device) is arranged in the cab of the vehicle 200 and outside the vehicle, and is connected to the on-board gateway unit 400. The remote monitoring client software alarm prompt subunit is arranged on a government industry management client software, an enterprise operation management client software, and a driver and passenger service client software in the remote management unit 600, and is connected to the on-board gateway unit 400.

The vehicle local alarm prompt subunit in the alarm prompt unit 500 can send a voice prompt or an acousto-optic alarm according to the monitoring and analysis result sent by the on-board gateway unit. The remote monitoring client software alarm prompt subunit in the alarm prompt unit 500 can send a voice or text prompt according to the monitoring analysis result sent by the on-board gateway unit.

Figure 4:
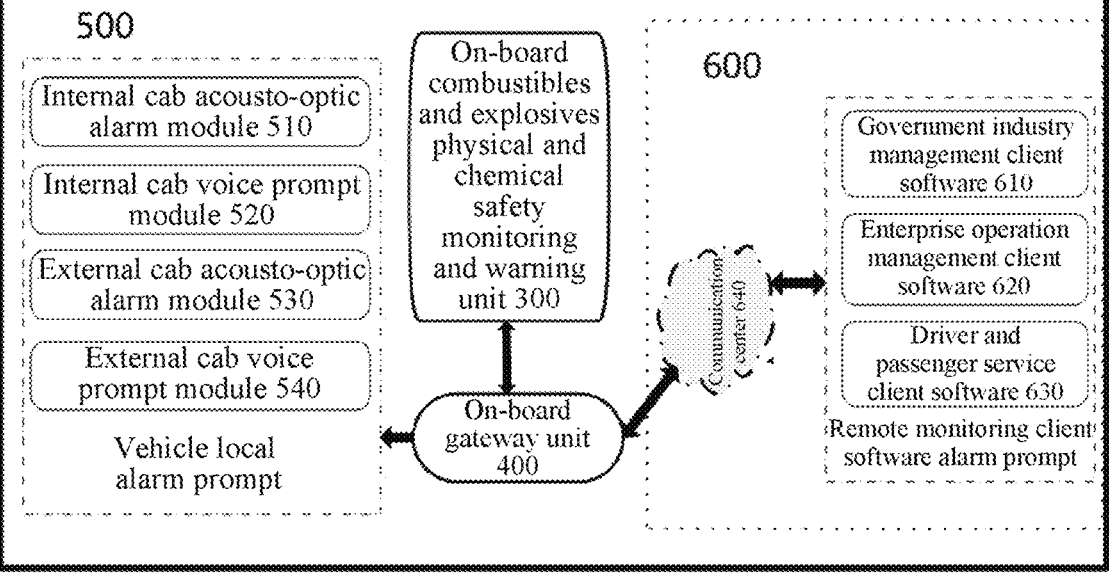
FIG. 4 is a schematic diagram of a composition principle and a use flow chart of an alarm prompt unit according to an example of the present invention.

FIG. 4 is a schematic diagram of a composition principle and a use flow chart of an alarm prompt unit 500 of the on-board combustibles and explosives anti-combustion and anti-explosion safety management system according to this example.

Based on FIG. 4, the alarm prompt unit 500 provided in this example is composed of vehicle local alarm prompt subunits, such as an internal cab acousto-optic alarm module 510, an internal cab voice prompt module 520, an external cab acousto-optic alarm module 530, and an external cab voice prompt module 540, and remote monitoring client software alarm prompt subunits, such as a government industry management client software 610, an enterprise operation management client software 620, and a driver and passenger service client software 630, which are in cooperation with each other.

The internal cab acousto-optic alarm module 510 is configured to send the acousto-optic alarm when receiving the on-board combustibles and explosives physical and chemical safety monitoring and warning information. As an example, the light emitted by the acousto-optic alarm of the acousto-optic alarm module is generally red by default.

The internal cab voice prompt module 520 is configured to send a voice prompt when receiving the on-board combustibles and explosives physical and chemical safety monitoring and warning information, reminding a driver to stop nearby or stop immediately for inspection. As an example, the internal cab voice prompt module can be arranged independently with the internal cab acousto-optic alarm module or combined into a voice acousto-optic alarm.

The external cab acousto-optic alarm module 530 is configured to send the acousto-optic alarm when receiving high-risk-level on-board combustibles and explosives physical and chemical safety monitoring and warning information. As an example, the light emitted by the acousto-optic alarm of the acousto-optic alarm module is generally red by default. The alarm sound is loud enough to alert passers-by in a noisy environment on a road.

The external cab voice prompt module 540 is configured to send a voice prompt when receiving the high-risk-level on-board combustibles and explosives physical and chemical safety monitoring and warning information, reminding other personnel on the road to avoid or warn a robber to stop a crime as soon as possible. As an example, the voice broadcast clarity of a voice warning content is sufficient to be clearly understood by a listener.

The government industry management client software 610 is configured to receive the alarm information forwarded by the on-board gateway unit through the communication center when the high-risk-level on-board combustibles and explosives physical and chemical safety monitoring and warning information occurs. As an example, the government industry management client software starts an emergency management process by default based on the emergency plan when receiving the high-risk-level on-board combustibles and explosives physical and chemical safety monitoring and warning information.

The enterprise operation management client software 620 is configured to receive the alarm information forwarded by the on-board gateway unit through the communication center when the on-board combustibles and explosives physical and chemical safety monitoring and warning information occurs. As an example, the enterprise operation management client software starts the emergency management process according to the emergency plan by default and sends emergency alarm information to the government industry management client synchronously when receiving the high-risk-level on-board combustibles and explosives physical and chemical safety monitoring and warning information.

The driver and passenger service client software 630 is configured to receive the alarm information forwarded by the on-board gateway unit through the communication center or push the emergency rescue guide file information of the on-board combustibles and explosives when the on-board combustibles and explosives physical and chemical safety monitoring and warning information occurs. As an example, the driver and passenger service client sends the voice prompt while sending the alarm message.

Based on FIG. 1 and FIG. 4, the alarm prompt unit 500 arranged in this way may be configured to send the acousto-optic alarm when receiving the on-board combustibles and explosives physical and chemical safety monitoring and warning information sent by the on-board combustibles and explosives physical and chemical safety monitoring and warning unit 300 through the internal cab acousto-optic alarm module 510;

may be configured to send the voice prompt when receiving the on-board combustibles and explosives physical and chemical safety monitoring and warning information sent by the on-board combustibles and explosives physical and chemical safety monitoring and warning unit 300 through the internal cab voice prompt module 520;

may be configured to send the acousto-optic alarm when receiving the high-risk-level on-board combustibles and explosives physical and chemical safety monitoring and warning information sent by the on-board combustibles and explosives physical and chemical safety monitoring and warning unit 300 through the external cab acousto-optic alarm module 530; and may be configured to send the voice prompt when receiving the high-risk-level on-board combustibles and explosives physical and chemical safety monitoring and warning information sent by the on-board combustibles and explosives physical and chemical safety monitoring and warning unit 300 through the external cab voice prompt module 540, reminding other personnel on the road to avoid.

The alarm prompt unit 500 arranged in this way may be configured to receive the alarm information forwarded by the on-board gateway unit 400 through the communication center by using the government industry management client software 610 when the high-risk-level on-board combustibles and explosives physical and chemical safety monitoring and warning information occurs; and may be configured to receive the alarm information forwarded by the on-board gateway unit 400 through the communication center by using the enterprise operation management client software 620 when the on-board combustibles and explosives physical and chemical safety monitoring and warning information occurs. The enterprise operation management client software starts the emergency management process according to the emergency plan by default and sends emergency alarm information to the government industry management client 610 synchronously when receiving the high-risk-level on-board combustibles and explosives physical and chemical safety monitoring and warning information; and may be configured to receive the alarm information forwarded by the on-board gateway unit 400 through the communication center by using the driver and passenger service client software 630 when the on-board combustibles and explosives physical and chemical safety monitoring and warning information occurs. The driver and passenger service client sends the voice prompt while sending an alarm message.

Based on FIG. 1, the remote management unit 600 in the system is arranged on a cloud platform of a competent government industry department related to automobile transportation and/or a local storage server and/or a personal handheld intelligent terminal of a relevant management personnel, a cloud platform and/or a local storage server and/or a personal handheld intelligent terminal of a relevant management personnel of a transportation enterprise and a transportation related party to which the vehicle belongs, and a personal handheld intelligent terminal of a driver and passenger. The remote management unit is directly related to the on-board gateway unit 400 of the vehicle, and is indirectly related to the on-board combustibles and explosives physical and chemical safety monitoring and warning unit 300 and the alarm prompt unit 500 through the on-board gateway unit 400.

The remote management unit 600 can send a command to set and adjust an alarm threshold of a relevant sensor of the on-board combustibles and explosives physical and chemical safety monitoring and warning unit, and receive the physical and chemical safety monitoring information of the on-board combustibles and explosives sent by the on-board gateway unit.

Figure 5:
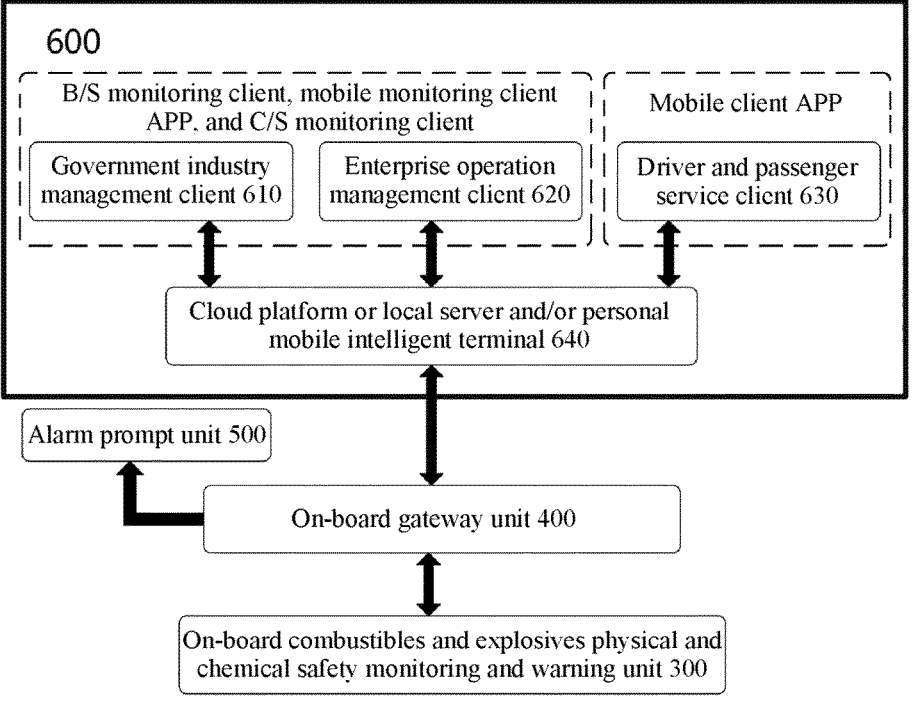
FIG. 5 is a schematic diagram of a composition principle and a use flow chart of a remote management unit according to an example of the present invention.

FIG. 5 is a schematic diagram of a composition principle and a use flow chart of a remote management unit 600 of the on-board combustibles and explosives anti-combustion and anti-explosion safety management system according to this example.

Figure 6:
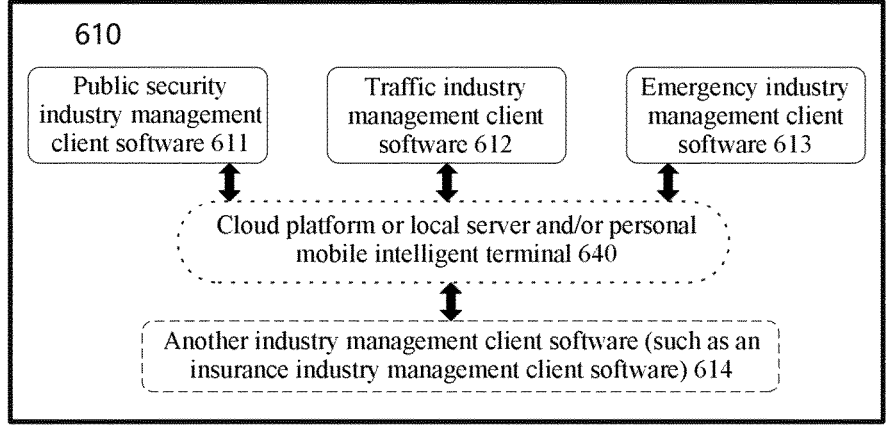
FIG. 6 is a schematic diagram of a principle of a composition of a government industry management client according to an example of the present invention.

Based on FIG. 6, the remote management unit 600 provided in this example includes a government industry management client software 610, an enterprise operation management client software 620, a driver and passenger service client software 630, and a communication center (a cloud platform or a local server and/or a personal mobile intelligent terminal) 640, which are in cooperation with each other.

The government industry management client software 610 in the remote management unit 600 is configured to receive and display high-risk-level on-board combustibles and explosives physical and chemical safety monitoring and warning information forwarded by the on-board combustibles and explosives physical and chemical safety monitoring and warning unit through the on-board gateway unit and the communication center, issue a relevant management command based on the received warning and alarm information, start the emergency management process, and issue a relevant emergency response command.

The enterprise operation management client software 620 in the remote management unit 600 is configured to receive and display on-board combustibles and explosives physical and chemical safety monitoring and warning information forwarded by the on-board combustibles and explosives physical and chemical safety monitoring and warning unit through the on-board gateway unit and the communication center, and send the relevant management command based on the received warning and alarm information; and start the emergency management process when the high-risk-level on-board combustibles and explosives physical and chemical safety monitoring and warning information is received, and send the emergency alarm to the government industry management client, and issue a relevant emergency response command.

The driver and passenger service client software 630 in the remote management unit 600 is configured to receive and display on-board combustibles and explosives physical and chemical safety monitoring and warning information forwarded by the on-board combustibles and explosives physical and chemical safety monitoring and warning unit through the on-board gateway unit and the communication center, send an acousto-optic alarm, a voice prompt, and an emergency rescue guide corresponding to alarm and warning information based on the received alarm and warning information, to prompt the driver to stop nearby or stop immediately for inspection, and issue a corresponding emergency response guide.

The communication center 640 in the remote management unit 600 is configured to communicate with the on-board gateway unit, receive and store the on-board combustibles and explosives physical and chemical safety monitoring and warning information or anti-theft and anti-robbery monitoring and warning information of the on-board combustibles and explosives forwarded by the on-board combustibles and explosives physical and chemical safety monitoring and warning unit through the on-board gateway unit, and forward the information to the government industry management client software, the enterprise operation management client software, and the driver and passenger service client software, respectively. The communication center also serves as a computer system environment for the government industry management client software, the enterprise operation management client software, and the driver and passenger service client software, and is configured to support a related software application, and forward management commands or response commands of the government industry management client software, the enterprise operation management client software, and the driver and passenger service client software to the on-board gateway unit.

Based on FIG. 1 and FIG. 5, the government industry management client software 610 in the remote management unit 600 arranged in this way may be configured to receive and display high-risk-level on-board combustibles and explosives physical and chemical safety monitoring and warning information forwarded by the on-board combustibles and explosives physical and chemical safety monitoring and warning unit 300 through the on-board gateway unit 400 and the communication center 640, send a relevant management command based on the received warning and alarm information, start the emergency management process, and issue a relevant emergency response command;

the enterprise operation management client software 620 may be configured to receive and display on-board combustibles and explosives physical and chemical safety monitoring and warning information forwarded by the on-board combustibles and explosives physical and chemical safety monitoring and warning unit 300 through the on-board gateway unit 400 and the communication center 640, and send the relevant management command such as an emergency rescue guide based on the received warning and alarm information; and start the emergency management process when the high-risk-level on-board combustibles and explosives physical and chemical safety monitoring and warning information or the anti-theft and anti-robbery monitoring and warning information of the on-board combustibles and explosives are received, and send the emergency alarm to the government industry management client 610, and issue a relevant emergency response command; and the driver and passenger service client software 630 may be configured to receive and display on-board combustibles and explosives physical and chemical safety monitoring and warning information forwarded by the on-board combustibles and explosives physical and chemical safety monitoring and warning unit 300 through the on-board gateway unit 400 and the communication center 640, send an acousto-optic alarm, a voice prompt, and an emergency rescue guide corresponding to alarm and warning information based on the received alarm and warning information.

The communication center 640 is configured to communicate with the on-board gateway unit 400, receive and store the on-board combustibles and explosives physical and chemical safety monitoring and warning information forwarded by the on-board combustibles and explosives physical and chemical safety monitoring and warning unit 300 through the on-board gateway unit 400, and forward the information to the government industry management client software 610, the enterprise operation management client software 620, and the driver and passenger service client software 630, respectively. The communication center 640) also serves as a computer system environment for the government industry management client software 610, the enterprise operation management client software 620, and the driver and passenger service client software 630, supports a related software application, and forwards the management commands or response commands of the government industry management client software 610, the enterprise operation management client software 620, and the driver and passenger service client software 630 to the on-board gateway unit 400.

The on-board combustibles and explosives anti-combustion and anti-explosion safety management system 100 formed thereby can monitor the temperature condition of the on-board combustibles and explosives and the temperature condition in the compartment in real time through the temperature monitoring module of the on-board combustibles and explosives physical and chemical safety monitoring and warning unit 300, monitor the humidity condition of the on-board combustibles and explosives and the humidity condition in the compartment in real time through the humidity monitoring module of the on-board combustibles and explosives physical and chemical safety monitoring and warning unit, monitor the pressure of the on-board combustibles and explosives and the pressure condition in the compartment or in the tank in real time through the pressure monitoring module of the on-board combustibles and explosives physical and chemical safety monitoring and warning unit, monitor the vibration condition in the compartment or the tank position of the vehicle loaded with the on-board combustibles and explosives in real time through the vibration monitoring module of the on-board combustibles and explosives physical and chemical safety monitoring and warning unit, and monitor the leakage condition of the on-board combustibles and explosives, the leakage condition of gas in the compartment of the vehicle loaded with the on-board combustibles and explosives, or the leakage condition of liquid or gas at the outlet of the tank through the leakage detection module of the on-board combustibles and explosives physical and chemical safety monitoring and warning unit. When the temperature, humidity, pressure, vibration intensity, or leakage detection result is higher than a set threshold, a risk of burning, explosion, or leakage of the combustibles and explosives occurs, the local warning acousto-optic or voice prompt is sent through the alarm prompt unit while the warning information is sent to the remote management unit.

The on-board gateway unit 400 in this system performs communication connection and data interaction of a plurality of devices installed in the on-board combustibles and explosives physical and chemical safety monitoring and warning unit through the network communication module, and realizes information exchange with the alarm prompt unit and the remote management unit. The data storage module is configured to aggregate and store monitoring data of the plurality of sensors, and the edge computing module is configured to intelligently analyze the plurality of monitoring data. When the intelligent analysis result of the plurality of detection data triggers a warning or an alarm, the on-board gateway unit sends the warning or alarm information to the alarm prompt unit and the remote management unit respectively through the network communication module. The alarm prompt unit sends the acousto-optic alarm or the voice alarms in or outside the cab through the internal cab acousto-optic alarm module and/or the voice prompt module, the external cab acousto-optic alarm module and/or the voice prompt module, and/or the remote alarm prompt module. The remote management unit can display the alarm prompt result or set the relevant sensor warning alarm threshold through the government industry management client, the enterprise operation management client, and the driver and passenger service client, respectively.

As a result, the physical and chemical safety information and the anti-theft safety information of the on-board combustibles and explosives during automatic monitoring and transportation are realized. When the on-board combustibles and explosives are in danger of explosion, the acousto-optic warning alarm or the voice prompt are delivered to the driver and passengers to remind the driver and passengers to get off the vehicle for inspection and handling in time. At the same time, the safety monitoring and warning information of the on-board combustibles and explosives is uploaded to the enterprise to which the vehicle belongs and the competent industry department, an emergency response voice prompt or a file push guide is played on the spot, and the emergency rescue is quickly started, so as to improve monitoring, warning, and prevention capabilities of a transportation safety accident of the combustibles and explosives, and improve emergency response efficiency to the transportation safety accident of the combustibles and explosives.

On this basis, this example further clearly shows a specific device that may be involved in a constituent module of each unit of the on-board combustibles and explosives anti-combustion and anti-explosion safety management system, and illustrates a feasible deployment solution of the corresponding unit module.

In conjunction with FIG. 1 and FIG. 2, the on-board combustibles and explosives physical and chemical safety monitoring and warning unit 300 in this system is preferably directly associated with the on-board gateway unit 400 during deployment, and is indirectly associated with the vehicle alarm prompt unit 500 and the remote management unit 600 through the on-board gateway unit 400.

In the on-board combustibles and explosives physical and chemical safety monitoring and warning unit 300 deployed in this way, the plurality of monitoring devices in the temperature monitoring module 310, the humidity monitoring module 320, the pressure monitoring module 330, the vibration monitoring module 340, and the leakage detection module 350 send the monitoring information to the network communication module of the on-board gateway unit 400, converge the detection data to the data storage module of the on-board gateway unit through the network communication module of the on-board gateway unit, and perform an intelligent analysis through the edge computing module of the on-board gateway unit 400. When the temperature, humidity, pressure, vibration intensity, or leakage detection result is higher than the set threshold, a warning message may be sent when the combustibles and explosives are at risk of burning, explosion, or leakage, the network communication module of the on-board gateway unit sends a corresponding acousto-optic alarm or voice prompt to the alarm prompt unit 500, and at the same time uploads the alarm prompt information to the remote management unit 600 through the network communication module of the on-board gateway unit 400.

FIG. 3 further shows a schematic composition solution of a network communication module 410 in the on-board gateway unit of the on-board combustibles and explosives anti-combustion and anti-explosion safety management system.

Based on FIG. 3, the network communication module 410 in the on-board gateway unit 400 provided in this example includes but is not limited to a 5G communication device 411, a CAN bus communication device 412, a TCP/IP communication device 413, a Bluetooth communication device 414, and another wireless communication (Wi-Fi, UWB, Zigbee, and the like) device 415, and the like.

The 5G communication device 411 is configured to communicate the on-board gateway unit with the remote management unit.

The CAN bus communication device 412 is configured to perform wired communication by using a CAN bus mode between the on-board gateway unit, the on-board combustibles and explosives physical and chemical safety monitoring and warning unit, and the alarm prompt unit.

The TCP/IP communication device 413 is configured to perform wired communication by using a TCP/IP bus mode between the on-board gateway unit, the on-board combustibles and explosives physical and chemical safety monitoring and warning unit, the alarm prompt unit, and the remote management unit.

The Bluetooth communication device 414 is configured to perform wireless communication based on a Bluetooth protocol between the on-board gateway unit, the on-board combustibles and explosives physical and chemical safety monitoring and warning unit, and the alarm prompt unit.

Another wireless communication (Wi-Fi, UWB, Zigbee, and the like) device 415 is configured to perform wireless communication based on a corresponding protocol such as Wi-Fi, UWB, and Zigbee between the on-board gateway unit, the on-board combustibles and explosives physical and chemical safety monitoring and warning unit, and the alarm prompt unit.

Based on FIG. 1 and FIG. 3, for the network communication module 410 arranged in this way, the 5G communication device 411 may be configured to perform communication between the on-board gateway unit 400 and the remote management unit 600.

The CAN bus communication device 412 may be configured to perform wired communication by using the CAN bus mode between the on-board gateway unit 400, the on-board combustibles and explosives physical and chemical safety monitoring and warning unit 300, and the alarm prompt unit 500.

The TCP/IP communication device 413 may be configured to perform wired communication by using the TCP/IP bus mode between the on-board gateway unit 400, the on-board combustibles and explosives physical and chemical safety monitoring and warning unit 300, the alarm prompt unit 500, and the remote management unit 600.

The Bluetooth communication device 414 may be configured to perform wireless communication based on a Bluetooth protocol between the on-board gateway unit 400, the on-board combustibles and explosives physical and chemical safety monitoring and warning unit 300, and the alarm prompt unit 400.

Another wireless communication (Wi-Fi, UWB, Zigbee, and the like) device 415 may be configured to perform wireless communication based on the corresponding protocol such as Wi-Fi, UWB, and Zigbee between the on-board gateway unit 400, the on-board combustibles and explosives physical and chemical safety monitoring and warning unit 300, and the alarm prompt unit 500.

In conjunction with FIG. 3, the example further shows a schematic composition solution of a data storage module 420 in the on-board gateway unit 400 of the on-board combustibles and explosives anti-combustion and anti-explosion safety management system.

In this example, the data storage module 420 preferably includes a built-in data storage device and an external data storage device.

The built-in data storage device includes but is not limited to a built-in static random access memory SRAM, a built-in dynamic random access memory DRAM, and a built-in hard disk. Meanwhile, the external data storage device includes but is not limited to an external mobile hard disk, a USB flash drive, a TF memory card, and a SD memory card.

In the example solution, the built-in data storage device and the external data storage device can be configured to store information uploaded by the on-board combustibles and explosives physical and chemical safety monitoring and warning unit.

In conjunction with FIG. 3, the example further shows a schematic composition solution of an edge computing module 430 in the on-board gateway unit 400 of the on-board combustibles and explosives anti-combustion and anti-explosion safety management system.

Specifically, the edge computing module 430 of the on-board gateway unit 400 includes an AI intelligent chip with edge computing function and a terminal SDK with edge computing.

In the example solution, the circuit board AI intelligent chip with an edge computing function and the terminal SDK with the edge computing function are configured to intelligently analyze and determine the monitoring information uploaded by the on-board combustibles and explosives physical and chemical safety monitoring and warning unit.

The on-board gateway unit 400 formed in this way is preferably directly associated with the on-board combustibles and explosives physical and chemical safety monitoring and warning unit 300, the alarm prompt unit 500, and the remote management unit 600 during deployment.

For on-board gateway unit 400 deployed in this way, when the on-board gateway unit receives the monitoring information of the on-board combustibles and explosives physical and chemical safety monitoring and warning unit and analyzes and determines that a relevant warning alarm of the combustibles and explosives is triggered, the on-board gateway unit sends an acousto-optic alarm or voice prompt information to the alarm prompt unit and the real-time monitoring information to the remote management unit; and when the on-board gateway unit receives an alarm command, a voice prompt command, or an alarm threshold setting adjustment sent by the remote management unit, the alarm command and the voice prompt command information are sent to the alarm prompt unit, and alarm threshold setting adjustment and circuit control command information are sent to the relevant monitoring device of the on-board combustibles and explosives physical and chemical safety monitoring and warning unit to adjust an alarm threshold of a monitoring sensor.

Referring to FIG. 1 and FIG. 4, in this example, when the alarm prompt unit 500 is deployed, the alarm prompt unit is preferably directly associated with the on-board gateway unit 400, and is indirectly associated with the on-board combustibles and explosives physical and chemical safety monitoring and warning unit 300 and the remote management unit 600 through the on-board gateway unit 400.

During the alarm prompt unit 500 deployed in this way operates with another unit, the alarm prompt unit sends an internal cab acousto-optic alarm and the voice prompt to prompt the driver to stop nearby or stop immediately for inspection, when the local alarm prompt subunit receives medium-risk or low-risk on-board combustibles and explosives physical and chemical safety monitoring and warning information sent by the on-board gateway unit.

When the local alarm prompt subunit receives the high-risk-level on-board combustibles and explosives physical and chemical safety monitoring and warning information, the alarm prompt unit sends internal and external cab acousto-optic alarms and voice prompts to prompt the driver to stop immediately for inspection, prompt passers-by to be alert to an abnormal vehicle, avoid in time, or call the police immediately.

When the remote monitoring client software alarm prompt subunit receives the medium-risk or low-risk on-board combustibles and explosives physical and chemical safety monitoring and warning information, the alarm prompt unit sends the alarm and prompt.

When the remote monitoring client software alarm prompt subunit receives the high-risk-level on-board combustibles and explosives physical and chemical safety monitoring and warning information, the alarm prompt unit sends the emergency alarm and the voice prompt, and starts the emergency management process according to the emergency plan by default.

FIG. 6 is a schematic diagram of a composition principle of a government industry management client 610 in a remote management unit 600 of the on-board combustibles and explosives anti-combustion and anti-explosion safety management system according to an example.

As shown in FIG. 6, the government industry management client 610 of the remote management unit 600 provided in this example includes a public security industry management client software 611, a traffic industry management client software 612, an emergency industry management client software 613, and another industry management client software (such as an insurance industry management client software) 614 according to the different competent industry departments.

Based on FIG. 4, FIG. 5, and FIG. 6, the public security industry management client software 611 of the government industry management client 610 is configured to receive and display high-risk-level on-board combustibles and explosives physical and chemical safety monitoring and warning information forwarded by the on-board combustibles and explosives physical and chemical safety monitoring and warning unit 300 through the on-board gateway unit 400 and the communication center 640, send a corresponding vehicle and location traffic accident handling command to a relevant traffic accident handler, and send 120 emergency rescue and another linkage management command according to the emergency plan setting.

The traffic industry management client software 612 of the government industry management client 610 is configured to receive and display on-board combustibles and explosives physical and chemical safety monitoring and warning information forwarded by the on-board combustibles and explosives physical and chemical safety monitoring and warning unit 300 through the on-board gateway unit 400 and the communication center 640, send a management command to a relevant traffic safety responsible unit based on an information type, and send another linkage management information according to the emergency plan setting.

The emergency industry management client software 613 of the government industry management client 610 is configured to receive and display the high-risk-level on-board combustibles and explosives physical and chemical safety monitoring and warning information or the anti-theft and anti-robbery monitoring and warning information of the on-board combustibles and explosives forwarded by the on-board combustibles and explosives physical and chemical safety monitoring and warning unit 300 through the on-board gateway unit 400 and the communication center 640, send an emergency response command to a fire and other related emergency rescue personnel based on an information type, a vehicle type, a cargo loading type of a freight vehicle, and the like, and send another linkage management information according to the emergency plan setting.

Another industry management client software (such as an insurance industry management client software) 614 of the government industry management client 610 is configured to receive and display on-board combustibles and explosives physical and chemical safety monitoring and warning information forwarded by the on-board combustibles and explosives physical and chemical safety monitoring and warning unit 300 through the on-board gateway unit 400 and the communication center 640, start an insurance claims business based on the information situation, and send another linkage management information according to the emergency plan setting. Another industry management client software supports function customization based on the corresponding industry management needs or independently selects to open or close the relevant monitoring client function within a scope of user authority.

Figure 7:
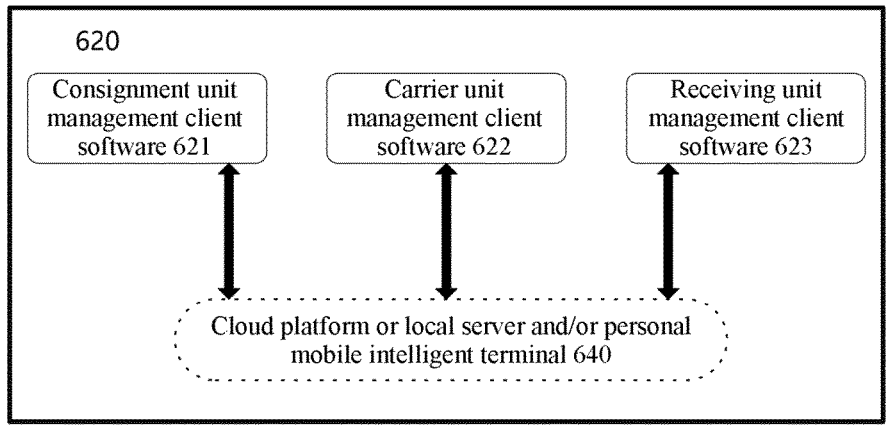
FIG. 7 is a schematic diagram of a principle of a composition of an enterprise operation management client according to an example of the present invention.

FIG. 7 is a schematic diagram of a composition principle of an enterprise operation management client 620 in a remote management unit 600 of the on-board combustibles and explosives anti-combustion and anti-explosion safety management system according to an example.

As shown in FIG. 7, the enterprise operation management client 620 of the remote management unit 600 provided in this example includes a consignment unit management client software 621, a carrier unit management client software 622, and a receiving unit management client software 623 depending on a user.

Based on FIG. 1, FIG. 5, and FIG. 7, the consignment unit management client software 621 in the enterprise operation management client 620 is configured to receive and display security tracking and inquiry information of a consignment vehicle.

The carrier unit management client software 622 of the enterprise operation management client 620 is configured to receive and display on-board combustibles and explosives physical and chemical safety monitoring and warning information forwarded by the on-board combustibles and explosives physical and chemical safety monitoring and warning unit 300 through the on-board gateway unit 400 and the communication center 640. When the warning alarm information is received, emergency rescue guide information is sent to the driver and passenger service client 630 by a text, an image, a voice, a document, and the like. When a high-risk-level warning alarm is received, emergency rescue guide information is sent to the driver and passenger service client 630 by a text, an image, a voice, a document, and the like, and a linkage alarm message is immediately sent to the government industry management client 610 synchronously based on the emergency plan setting.

The receiving unit management client software 623 of the enterprise operation management client 620 is configured to receive and display security tracking and inquiry information of a consignment vehicle.

Figure 8:
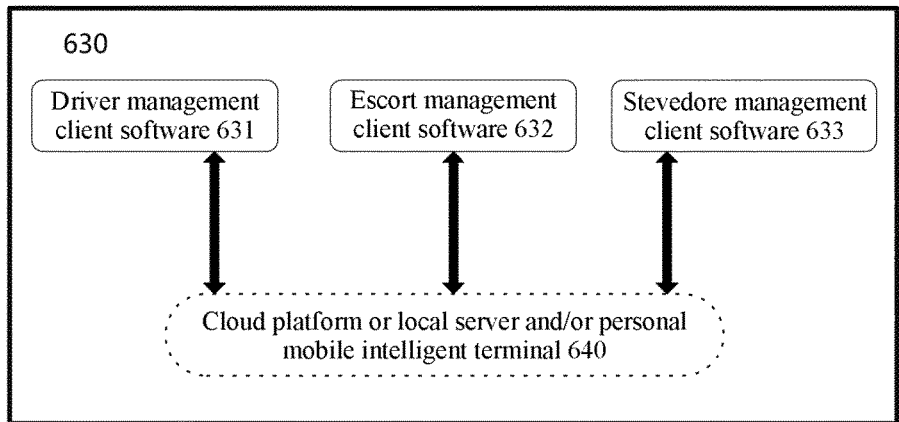
FIG. 8 is a schematic diagram of a principle of a composition of a driver and passenger service client according to an example of the present invention.

FIG. 8 is a schematic diagram of a composition principle of a driver and passenger service client 630 in a remote management unit 600 of the on-board combustibles and explosives anti-combustion and anti-explosion safety management system according to an example.

As shown in FIG. 8, the driver and passenger service client 630 of the remote management unit 600 provided in this example includes a driver service client software 631, an escort management client software 632, and a stevedore management client software 633 depending on a user.

Based on FIG. 1, FIG. 5, and FIG. 8, the driver service client software 631 in the driver and passenger service management client 630 is configured to receive and display the high-risk-level on-board combustibles and explosives physical and chemical safety monitoring and warning information forwarded by the on-board combustibles and explosives physical and chemical safety monitoring and warning unit 300 through the on-board gateway unit 400 and the communication center 640, receive and display emergency rescue guide information sent by the carrier management client 622 by a text, an image, a voice, a document, and the like for an operating vehicle, or display the emergency rescue guide information automatically pushed by the driver service client software after triggering the relevant warning and alarm information. The driver service client software supports voice broadcast warning information; and supports feedback of a risk check condition and a handling result to the government industry management client and the carrier management client after the driver completes a risk inspection.

The escort management client software 632 in the driver and passenger service client 630 is configured to receive and display the on-board combustibles and explosives physical and chemical safety monitoring and warning information forwarded by the electronic waybill for road transportation of the dangerous good and the on-board combustibles and explosives physical and chemical safety monitoring and warning unit 300 through the on-board gateway unit 400 and the communication center 640, receive and display emergency rescue guide information sent by the carrier management client 622 by a text, an image, a voice, a document, and the like for an operating vehicle, or display the emergency rescue guide information automatically pushed by the escort management client software after triggering the relevant warning and alarm information. The escort management client software supports voice broadcast warning information; and support feedback of a risk check condition and a handling result to the government industry management client and the carrier management client by an escort after the driver completes a risk inspection.

The stevedore management client software 633 in the driver and passenger service client 630 is configured to receive and display an electronic waybill for road transport of a dangerous good, and supports an inquiry of a type, a quantity, a loading and unloading requirement, physical properties, chemical properties, physical and chemical hazards, and corresponding emergency rescue guide information of the combustibles and explosives carried at current time.

Figure 9:
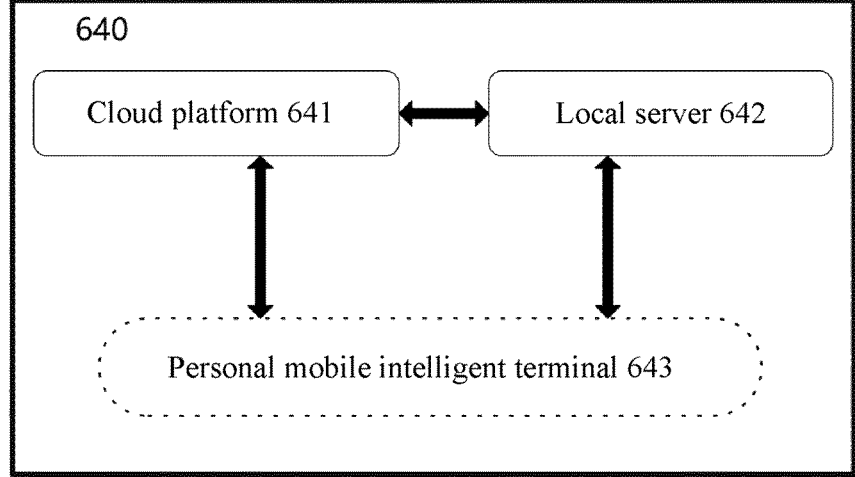
FIG. 9 is a schematic diagram of a composition of a communication center according to an example of the present invention.

FIG. 9 is a schematic diagram of composition of a communication center 640 in a remote management unit 600 of the on-board combustibles and explosives anti-combustion and anti-explosion safety management system according to an example.

Based on FIG. 9, the communication center 640) of the remote management unit 600 provided in this example includes a cloud platform 641, a local server 642, and a personal mobile intelligent terminal 643. In this example, the cloud platform 641 is preferably combined with a communication center application mode of the personal mobile intelligent terminal 643, which can be determined according to an actual communication condition of a different user, and is not limited here.

Based on FIG. 1, FIG. 5, and FIG. 9, the cloud platform 641 in the communication center 640 is used for storage of data information and alarm information uploaded by the on-board gateway unit 400, and a shared data resource pool for data reception and invocation of the government industry management client software 610/the enterprise operation management client software 620/the driver and passenger service client software 630. The cloud platform is configured to support a computer hardware platform environment of the application of the government industry management client software 610/the enterprise operation management software 620/the driver and passenger service client software 630, and used for communication interaction between the government industry management client software 610/the enterprise operation management client software 620/the driver and passenger service client software 630 and the on-board gateway unit 400. The cloud platform 641 is configured to communicate with the on-board gateway unit 400, receive and store the on-board combustibles and explosives physical and chemical safety monitoring and warning information forwarded by the on-board combustibles and explosives physical and chemical safety monitoring and warning unit 300 through the on-board gateway unit 400, and forward the management command or the response command of the government industry management client software 610, the enterprise operation management client software 620, and the driver and passenger service client software 630 to the on-board gateway unit 400. As an example, the cloud platform 641 supports a B/S monitoring client application, and the B/S monitoring client is preferably developed based on a latest version of a high-security operating system and a high-security browser (Xin Chuang version).

The local server 642 in the communication center 640 is used for storage of data information and alarm information uploaded by the on-board gateway unit 400, and a data resource pool for data reception and invocation of the government industry management client software 610/the enterprise operation management client software 620/the driver and passenger service client software 630, respectively. The cloud platform is configured to support a computer hardware platform environment of the application of the government industry management client software 610/ the enterprise operation management client software 620/the driver and passenger service client software 630, and used for communication interaction between the government industry management client software 610/the enterprise operation management client software 620/the driver and passenger service client software 630 and the on-board gateway unit 400. The local server 642 is configured to communicate with the on-board gateway unit 400, receive and store the on-board combustibles and explosives physical and chemical safety monitoring and warning information forwarded by the on-board combustibles and explosives physical and chemical safety monitoring and warning unit 300 through the on-board gateway unit 400, and forward the management command or the response command of the government industry management client software 610, the enterprise operation management client software 620, and the driver and passenger service client software 630 to the on-board gateway unit 400. As an example, the local server 642 supports a C/S monitoring client application, and the C/S monitoring client is developed based on a latest version of various high-security operating systems of a Linux kernel.

The personal mobile intelligent terminal 643 in the communication center 640 is used for storage of data information and alarm information uploaded by the on-board gateway unit 400, an online query tool and temporary storage space for uploaded data information for the government industry management client APP software 610/the enterprise operation management client APP software 620/the driver and passenger service client APP software 630. The cloud platform is configured to support a computer hardware platform environment of the application of the government industry management client APP software 610/the enterprise operation management client APP software 620/the driver and passenger service client APP software 630, and used for communication interaction between the government industry management client APP software 610/the enterprise operation management client APP software 620/the driver and passenger service client APP software 630 and the on-board gateway unit 400.

Further, the personal mobile intelligent terminal 643 is further configured to communicate with the on-board gateway unit 400 through the cloud platform 641 or the local server 642, receive and store the on-board combustibles and explosives physical and chemical safety monitoring and warning information forwarded by the on-board combustibles and explosives physical and chemical safety monitoring and warning unit 300 through the on-board gateway unit 400, and forward the management command or the emergency rescue guide information of the government industry management client APP software 610/the enterprise operation management client APP software 620/the driver and passenger service client APP software 630 to the on-board gateway unit 400. As an example, the mobile monitoring client APP is preferably developed based on the HarmonyOS microkernel or Android and another operating system based on the Linux kernel.

The remote management unit 640 formed in this way is arranged on a cloud platform of a competent government industry department related to vehicle traffic management or operation management and/or a local storage server and/or a personal hand-held intelligent terminal of a relevant management person, a cloud platform and/or a local storage server of a transport enterprise to which the vehicle belongs and transport-related parties and/or a personal hand-held intelligent terminal of a relevant management person, and a personal hand-held intelligent terminal of a driver and passenger during deployment. The remote management unit is directly related to the on-board gateway unit 400, and is indirectly related to the on-board combustibles and explosives physical and chemical safety monitoring and warning unit 300 and the alarm prompt unit 500 through the on-board gateway unit 400.

The remote management unit 640 deployed in this way may be configured to receive on-board combustibles and explosives physical and chemical safety monitoring and warning information sent by the on-board gateway unit, and issue the driver management command based on the alarm information, feed back to the on-board gateway unit, and feed back to the alarm prompt unit through the on-board gateway unit. The remote management unit deployed in this way supports adjusting the warning alarm threshold and the information upload frequency of the relevant monitoring device of the on-board combustibles and explosives physical and chemical safety monitoring and warning unit through the relevant monitoring client software settings, and pushes the emergency rescue guide information for transportation of the combustibles and explosives.

When the on-board combustibles and explosives anti-combustion and anti-explosion safety management system formed based on the specific solution provided in this example operates, the system can automatically monitor the physical and chemical safety information of the on-board combustibles and explosives physical and chemical safety monitoring and warning unit. When the on-board combustibles and explosives are in danger of explosion, the acousto-optic warning alarm or the voice prompt are delivered to the driver and passengers to remind the driver and passengers to get off the vehicle for inspection and handling in time, and push and play the emergency response voice prompt or the document guide on the spot to help the driver and passenger quickly start emergency handling.

Based on the above, the system further cooperates with the setting of the remote management unit, so that the physical and chemical safety monitoring information of the on-board combustibles and explosives can be linked in real time with the competent industry department and affiliated unit. While helping the driver and passengers handle on site and preventing an accident, time for an early deployment of emergency rescue and handling force and a rapid start of emergency rescue work gains, thereby helping to improve monitoring, warning, and prevention capabilities of a transportation safety accident of the combustibles and explosives, and improve emergency response efficiency to the transportation safety accident of the combustibles and explosives.

Finally, it should be noted that the above method of the present invention, or a specific system unit, or part of the unit, can be arranged on physical media, such as a hard disk, an optical disc, or any electronic device (such as a smart phone, a computer-readable storage media). When a machine loads and executes the program code (such as, a smart phone loads and executes), the machine becomes a device for performing the present invention. The above method and device of the present invention can also transmit a program code through some transmission media, such as a cable, an optical fiber, or any transmission mode. When the program code is received, loaded, and executed by the machine (such as the smart phone), the machine becomes a device for performing the present invention.

The basic principles, main features and advantages of the present invention have been shown and described above. Those skilled in the art should understand that the present invention is not limited by the above-mentioned embodiments. The foregoing embodiments and the description in the specification only illustrate the principle of the present invention. Without departing from the spirit and scope of the present invention, there will be various changes and improvements in the present invention, and these changes and improvements fall within the scope of the claimed invention. The scope of the claims of the present invention is defined by the appended claims and the equivalents.

What is claimed is:

1. An on-board combustibles and explosives anti-combustion and anti-explosion safety management system, comprising:

an on-board combustibles and explosives physical and chemical safety monitoring and warning unit, wherein the on-board combustibles and explosives physical and chemical safety monitoring and warning unit is associated with an on-board gateway unit, and is associated with an alarm prompt unit and a remote management unit through the on-board gateway unit and the on-board combustibles and explosives physical and chemical safety monitoring and warning unit is configured to: monitor a physical and chemical safety parameter of the on-board combustibles and explosives in real time, perform warning analysis on physical and chemical safety of the on-board combustibles and explosives directly or in cooperation with the on-board gateway unit based on the monitored information, generate warning information when a physical and chemical safety risk occurs in the on-board combustibles and explosives, send warning information to the remote management unit through the on-board gateway unit, and send a warning through the alarm prompt unit;

the on-board gateway unit, wherein the on-board gateway unit is respectively associated with the on-board combustibles and explosives physical and chemical safety monitoring and warning unit, the alarm prompt unit, and the remote management unit, a communication channel is established between the units to complete data exchange, and the on-board gateway unit is configured to complete risk warning processing based on the data information collected by the unit in cooperation with the on-board combustibles and explosives physical and chemical safety monitoring and warning unit;

the alarm prompt unit, wherein the alarm prompt unit is connected to the on-board gateway unit, and is configured to complete a local alarm on a vehicle and/or complete a remote alarm through the remote management unit associated with the on-board gateway unit; and the remote management unit, wherein the remote management unit is associated with the on-board gateway unit, is indirectly associated with the on-board combustibles and explosives physical and chemical safety monitoring and warning unit and the alarm prompt unit through the on-board gateway unit, and the remote management unit is configured to form system configuration information and/or emergency handling information, and receive on-board combustibles and explosives physical and chemical safety monitoring and warning information sent by the on-board gateway unit.

2. The on-board combustibles and explosives anti-combustion and anti-explosion safety management system according to claim 1, wherein the on-board combustibles and explosives physical and chemical safety monitoring and warning unit comprises one or more of a temperature monitoring module, a humidity monitoring module, a pressure monitoring module, a vibration monitoring module, and a leakage detection module;

the temperature monitoring module is configured to obtain real-time information of a temperature of the on-board combustibles and explosives, a temperature in a compartment, or a temperature of a tank, and transmit the obtained information to the on-board gateway unit or to the remote management unit through the on-board gateway unit;

the humidity monitoring module is configured to obtain real-time information of a humidity of the on-board combustibles and explosives and a humidity in the compartment, and transmit the obtained information to the on-board gateway unit or to the remote management unit through the on-board gateway unit;

the pressure monitoring module is configured to obtain real-time information of a pressure of the on-board combustibles and explosives, a pressure in the compartment, or a pressure in the tank, and transmit the obtained information to the on-board gateway unit or to the remote management unit through the on-board gateway unit;

the vibration monitoring module is configured to obtain real-time information of vibration in a vehicle compartment or at a tank position loaded with the on-board combustibles and explosives, and transmit the obtained information to the on-board gateway unit or to the remote management unit through the on-board gateway unit; and the leakage detection module is configured to obtain real-time information of a leakage condition of the on-board combustibles and explosives and a leakage condition of gas in the vehicle compartment loaded with the on-board combustibles and explosives or a leakage condition of liquid or gas at an outlet of the tank, and transmit the obtained information to the on-board gateway unit or to the remote management unit through the on-board gateway unit.

3. The on-board combustibles and explosives anti-combustion and anti-explosion safety management system according to claim 2, wherein each monitoring device of a temperature monitoring module, a humidity monitoring module, a pressure monitoring module, a vibration monitoring module, and a leakage detection module in the on-board combustibles and explosives physical and chemical safety monitoring and warning unit is configured to aggregate the monitoring information to a data storage module of the on-board gateway unit, perform warning analysis through the on-board gateway unit, and send a corresponding warning prompt to the alarm prompt unit through the on-board gateway unit and upload alarm prompt information to the remote management unit through the on-board gateway unit when a temperature, a humidity, a pressure, a vibration intensity, or a leakage detection result is higher than a set threshold, and a risk of combustion, explosion, or leakage of the combustibles and explosives occurs.

4. The on-board combustibles and explosives anti-combustion and anti-explosion safety management system according to claim 1, wherein the on-board gateway unit comprises a network communication module and/or a data storage module and/or an edge computing module;

the network communication module is configured for data interaction between the on-board combustibles and explosives physical and chemical safety monitoring and warning unit, the alarm prompt unit, and the remote management unit;

the data storage module is configured to store monitoring information uploaded by the on-board combustibles and explosives physical and chemical safety monitoring and warning unit; and the edge computing module is configured to intelligently analyze and determine the monitoring information uploaded by the on-board combustibles and explosives physical and chemical safety monitoring and warning unit.

5. The on-board combustibles and explosives anti-combustion and anti-explosion safety management system according to claim 1, wherein the on-board gateway unit is directly related to the on-board combustibles and explosives physical and chemical safety monitoring and warning unit, the alarm prompt unit, and the remote management unit;

when the on-board gateway unit receives the monitoring information of the on-board combustibles and explosives physical and chemical safety monitoring and warning unit and analyzes and determines that a warning and alarm related to combustion and explosion of the combustibles and explosives is triggered, the on-board gateway unit sends an acousto-optic alarm or voice prompt information to the alarm prompt unit and sends warning and alarm information and real-time monitoring information to the remote management unit; and when receiving an alarm command, a voice prompt command, or an alarm threshold setting adjustment, or emergency rescue guide information sent by the remote management unit, the on-board gateway unit sends the alarm command and the voice prompt command information to the alarm prompt unit, and sends the alarm threshold setting adjustment and circuit control command information to a relevant monitoring device of the on-board combustibles and explosives physical and chemical safety monitoring and warning unit to perform a relevant operation of adjusting an alarm threshold of a monitoring sensor.

6. The on-board combustibles and explosives anti-combustion and anti-explosion safety management system according to claim 1, wherein the alarm prompt unit comprises a vehicle local alarm prompt subunit and a remote monitoring client software alarm prompt subunit.

7. The on-board combustibles and explosives anti-combustion and anti-explosion safety management system according to claim 1, wherein the remote management unit comprises a government industry management client software, an enterprise operation management client software, a driver and passenger service client software, and a communication center;

the government industry management client software is configured to receive and display high-risk-level on-board combustibles and explosives physical and chemical safety monitoring and warning information forwarded by the on-board combustibles and explosives physical and chemical safety monitoring and warning unit through the on-board gateway unit and the communication center, send a relevant management command based on received warning and alarm information, start an emergency management process, and issue a relevant emergency response command;

the enterprise operation management client software is configured to receive and display on-board combustibles and explosives physical and chemical safety monitoring and warning information forwarded by the on-board combustibles and explosives physical and chemical safety monitoring and warning unit through the on-board gateway unit and the communication center, send the relevant management command or the emergency rescue guide information based on the received warning and alarm information, and start the emergency management process, push emergency rescue guide file information of the on-board combustibles and explosives to an emergency rescue guide module of the on-board combustibles and explosives, send an emergency alarm to the government industry management client, and issue a relevant emergency response command when receiving the high-risk-level on-board combustibles and explosives physical and chemical safety monitoring and warning information;

the driver and passenger service client software is configured to receive and display on-board combustibles and explosives physical and chemical safety monitoring and warning information forwarded by the on-board combustibles and explosives physical and chemical safety monitoring and warning unit through the on-board gateway unit and the communication center, send an acousto-optic alarm, a voice prompt, and an emergency rescue guide corresponding to alarm and warning information based on the received alarm and warning information, to prompt the driver to stop nearby or stop immediately for inspection, and provide a corresponding emergency response guideline; and the communication center is configured to communicate with the on-board gateway unit, receive and store the on-board combustibles and explosives physical and chemical safety monitoring and warning information forwarded by the on-board combustibles and explosives physical and chemical safety monitoring and warning unit through the on-board gateway unit, and forward the physical and chemical safety monitoring and warning information to the government industry management client software, the enterprise operation management client software, and the driver and passenger service client software respectively.

8. The on-board combustibles and explosives anti-combustion and anti-explosion safety management system according to claim 1, wherein the remote management unit is arranged on a cloud platform and/or a local storage server of a competent government industry department related to vehicle traffic management or operation management and/or a personal hand-held intelligent terminal of a relevant management person, a cloud platform and/or a local storage server of a transport enterprise and transport-related parties to which the vehicle belongs and/or a personal hand-held intelligent terminal of a relevant management person, and a personal hand-held intelligent terminal of a driver and passenger, is associated with the on-board gateway unit, and is indirectly associated with the on-board combustibles and explosives physical and chemical safety monitoring and warning unit and the alarm prompt unit through the on-board gateway unit.

9. The on-board combustibles and explosives anti-combustion and anti-explosion safety management system according to claim 4, wherein the on-board gateway unit is directly related to the on-board combustibles and explosives physical and chemical safety monitoring and warning unit, the alarm prompt unit, and the remote management unit;

when the on-board gateway unit receives the monitoring information of the on-board combustibles and explosives physical and chemical safety monitoring and warning unit and analyzes and determines that a warning and alarm related to combustion and explosion of the combustibles and explosives is triggered, the on-board gateway unit sends an acousto-optic alarm or voice prompt information to the alarm prompt unit and sends warning and alarm information and real-time monitoring information to the remote management unit; and when receiving an alarm command, a voice prompt command, or an alarm threshold setting adjustment, or emergency rescue guide information sent by the remote management unit, the on-board gateway unit sends the alarm command and the voice prompt command information to the alarm prompt unit, and sends the alarm threshold setting adjustment and circuit control command information to a relevant monitoring device of the on-board combustibles and explosives physical and chemical safety monitoring and warning unit to perform a relevant operation of adjusting an alarm threshold of a monitoring sensor.

\* \* \* \* \*